United States Patent [19]
Barq et al.

[11] Patent Number: 5,478,118
[45] Date of Patent: Dec. 26, 1995

[54] THERMO-WELDABLE COUPLING FOR TUBES OF PLASTICS MATERIAL, AS WELL AS A METHOD FOR ITS MANUFACTURE

[75] Inventors: Philippe Barq, Nice, France; Malcolm R. Barfield, Norton Canes, England; Cyrille Grandclement, Paris, France

[73] Assignee: Innoge S.A.M., Monaco

[21] Appl. No.: 72,549

[22] Filed: Jun. 4, 1993

[30] Foreign Application Priority Data

Jun. 4, 1992 [FR] France .................. 92 07018

[51] Int. Cl.⁶ .................................. F16L 13/02
[52] U.S. Cl. .................. 285/21; 285/423; 219/535; 219/545; 156/304.2; 156/158
[58] Field of Search .................. 285/21, 423, 417, 285/369; 156/304.2, 158, 502, 275.1; 219/535, 544, 545, 548, 549; 338/208

[56] References Cited

U.S. PATENT DOCUMENTS

| | | | |
|---|---|---|---|
| 3,061,503 | 10/1962 | Gould et al. | 219/544 X |
| 4,362,684 | 12/1982 | Thalmann | 285/21 X |
| 4,530,521 | 7/1985 | Nyffeler et al. | 285/21 |
| 4,852,914 | 8/1989 | Lyall | 285/21 |
| 4,893,521 | 1/1990 | Ishida et al. | 74/552 |
| 4,894,521 | 1/1990 | Evans | 219/535 X |
| 4,906,313 | 3/1990 | Hill | 219/544 X |
| 4,983,814 | 1/1991 | Ohgushi et al. | 219/544 X |
| 5,125,090 | 6/1992 | Taylor et al. | 285/21 |
| 5,141,580 | 5/1992 | Dufour et al. | 156/158 |
| 5,150,922 | 9/1992 | Nakashiba et al. | 285/21 |
| 5,160,396 | 11/1992 | Jensen et al. | 150/304.2 |
| 5,163,713 | 11/1992 | Brettell et al. | 285/21 |
| 5,169,176 | 12/1992 | Brossard | 285/21 |
| 5,255,943 | 10/1993 | Keller et al. | 285/21 |

FOREIGN PATENT DOCUMENTS

| | | | |
|---|---|---|---|
| 0170845 | 2/1986 | European Pat. Off. | F16L 47/02 |
| 0430762 | 11/1990 | European Pat. Off. | |
| 3148332 | 6/1983 | Germany | B29C 27/06 |

*Primary Examiner*—Randolph A. Reese
*Assistant Examiner*—Heather Chun Shackelford
*Attorney, Agent, or Firm*—Morgan & Finnegan

[57] ABSTRACT

Thermo-weldable coupling for connecting in particular at least two members made from an identical or compatible plastics material, comprising a body (1) which is of the type constituted at least partly by a thermo-fusible material compatible with the plastics material of these members and which comprises an inner wall (2) or connection surface, directly opposite the outer wall of the members, provided with an electrically conducting element (3). This electrically conducting element (3) is resilient and of non-rectilinear shape. Application to the connections of fluid-carrying pipes made from plastics material.

14 Claims, 2 Drawing Sheets

THERMO-WELDABLE COUPLING FOR TUBES OF PLASTICS MATERIAL, AS WELL AS A METHOD FOR ITS MANUFACTURE

FIELD OF THE INVENTION

At present, in order to connect two tubes of the same plastics material, one uses a coupling which is also made from the same plastics material, into which the ends of the tubes to be connected are inserted. Embedded in the inner wall of the coupling, i.e., the wall opposite the outer surfaces of the tubes, is an electrical resistance: when current is passed into this resistance, this causes melting of the opposing surfaces, which ensures welding on cooling.

BACKGROUND OF THE INVENTION

In order that the welding is of good quality, that is to say in order that one obtains a joint which is tight with respect to gaseous fluids and which has satisfactory mechanical strength, the electrical power and the heating time must be wisely chosen. In addition, the outer wall of the tubes to be welded must be previously cleaned: it is necessary to scrape the surface in order to remove the superficial layer of oxidized material which has been changed by aging. In fact, the storage of the tubes is sometimes long, which exposes the outer wall of the tubes to all types of attack.

If this cleaning operation, in fact scraping, is not carried out carefully, the connection of the two tubes has every chance of proving unsuitable, i.e., having an appreciable danger of leakage in the long term and/or poor mechanical behavior. Drawbacks of this type, even to the point of risk, are not acceptable and may be the cause of catastrophes.

It should be noted that the scraping operation is hard and not without risks for the worker responsible for carrying it out.

DISCUSSION OF THE INVENTION

This is why it is one of the objects of the present invention to provide a thermo-weldable coupling which makes it possible to connect two tubes of a plastics material in a completely tight manner and without jeopardizing the mechanical strength of the arrangement.

Another object of the invention, which is in fact the consequence or cause of the former, is to provide a coupling of this type which makes it possible to eliminate the consequences of inadequate cleaning operations, more particularly scraping, or even to eliminate them.

One additional object of the invention is to provide a coupling of this type whereof the cost is low and the implementation of which is as close as possible to that for the couplings currently used.

These objects, as well as others which will become apparent hereafter, are achieved by a thermo-weldable coupling for connecting in particular at least two members made from an identical or compatible plastics material, comprising a body which is of the type constituted at least partly by a thermo-fusible material compatible with said plastics material of said members and which comprises an inner wall or connection surface, directly opposite the outer wall of said members, provided with an electrically conducting element of non-rectilinear shape, which coupling is characterized, according to the present invention, by the fact that said electrically conducting element is resilient so that when hot, it occupies a volume greater than that which it would occupy at ambient temperature.

Advantageously, this electrically conducting element is covered with an insulating varnish which withstands the welding temperatures.

According to a first embodiment of the present invention, the electrically conducting element is a net obtained by knitting a single wire, which is itself electrically conducting, which is possibly covered with a layer of thermo-fusible material compatible with that constituting the coupling.

Advantageously, the coupling comprises a body in the shape of a sleeve, whereof one part of the inner wall comprises the net constituting the electrically conducting element.

Preferably the electrically conducting element may, according to one variation, be constituted by a wire twisted about itself and wound in a spiral or helix.

According to one variation, the electrically conducting element is a net obtained by knitting a conducting wire and a non-conducting wire, the latter consisting for example of a plastics material.

According to a second embodiment, the electrically conducting element is constituted by two sheets which are obtained by knitting a single wire, itself electrically conducting and possibly covered with a plastics material compatible with that of the coupling, which are in the form of a largely open cone and with their vertices in facing relationship, provided with an opening substantially of the same diameter.

In this case, the body constituting the coupling is preferably of approximately semi-cylindrical shape and comprises a branch whereof the inner diameter corresponds substantially to the diameter of the openings of the electrically conducting element and has the same axis.

Preferably, the two sheets are pressed one against the other with interposition of an insulating disc.

As has been stated, the present invention also relates to a method for the manufacture of a coupling such as that previously described. This method is characterized by the fact that after the production of the body of the coupling, the electrically conducting element is applied under pressure against the inner wall and that it is held there by force and that this electrical element is heated either by joulean effect, or by electro-magnetic induction, which causes a rise in temperature of the inner wall and consequently a penetration of this electrical element into this wall, since it is held by force against it.

DESCRIPTION OF PREFERRED EMBODIMENTS OF THE INVENTION

Figure 1:
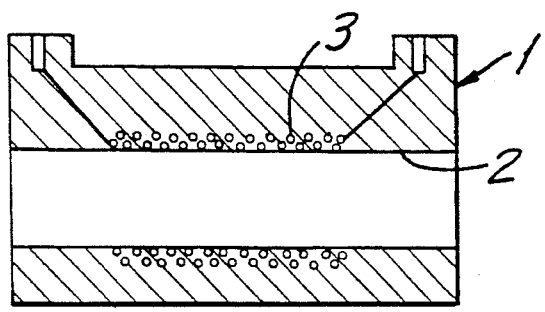
FIG. 1 is a longitudinal sectional view of a coupling according to a first embodiment of the present invention.

As can be seen in particular from FIG. 1, a thermo-weldable coupling for tubes of plastics material comprises a body designated generally by the reference numeral 1: the latter is made from a thermo-fusible material compatible with the plastics material of the tubes to be joined.

According to this first embodiment, coupling 1 is in the general shape of a sleeve, whereof the inner wall 2, or connecting surface, is directly opposite the outer wall of the tubes to be connected. This inner wall 2 includes an electrical element 3 which is resilient and of non-rectilinear shape.

Figure 3:
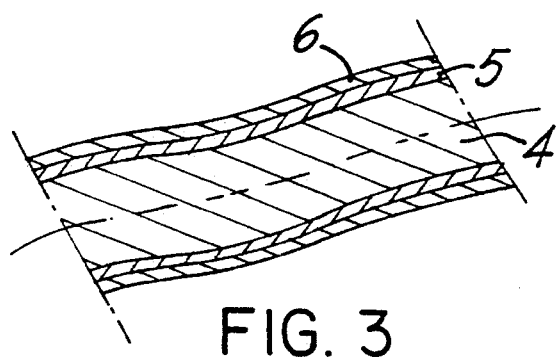
FIG. 3 is a partial longitudinal sectional view of a wire constituting the electrical element according to FIG. 2.

According to this embodiment, the electrical element 3 is a net which is made by knitting a single wire 4, which is electrically conducting and covered with a varnish 5, as shown in FIG. 3, which varnish is insulating and can withstand the welding temperatures. In order to protect this varnish 5 at the time of knitting, the wire 4 may be covered with a layer of thermo-fusible material 6 identical or at the least compatible with that (those) constituting the coupling and the tubes.

The conducting wire 4, which is electrically insulated by the varnish 5, may also be wound in a helix about a core of a plastics material which is thermo-fusible at the welding temperature: there will then be freedom of the movements of the wire.

Figure 2:
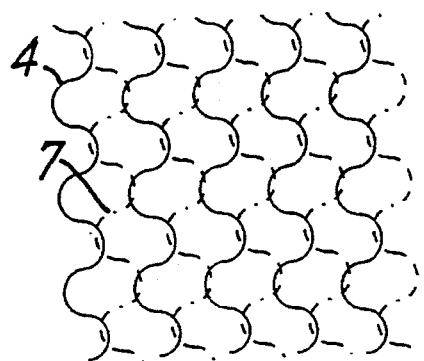
FIG. 2 is a partial view of an electrical element comprised in the coupling according to FIG. 1.

According to one variation (see FIG. 2) net 3 may be made by knitting together two wires: one which is conducting (4) and the other which is non-conducting (7) and obtained for example, by extrusion of plastics material. As a man skilled in the art will understand, in this, variation, the wire 4 need not be non-electrically insulated, since it will never be in contact with itself.

The net 3 is situated against the surface of the inner wall 2 and is connected to an outer electrical source at the time of welding of the coupling to the tubes, as is known by a man skilled in the art.

The net 3 may possibly be constituted by two or three sheets connected electrically to each other: in other words, instead of being continuous, it may be divided into two or three sub-assemblies.

At the time of the connecting operations, one end of each tube to be connected is fitted into the coupling 1. By connecting the net 3 to an external electrical source, one causes heating of the inner wall 2 as well as of the outer wall of the tubes to be welded. As the net 3 cools, it tends to resume its initial shape before its inclusion in the internal wall 2: it shrinks and resumes its initial thickness. In this way, the cooling net 3 penetrates at least partly into the still molten material of the tube during welding, thus causing a macromolecular exchange of material between the inner wall 2 of the coupling 1 and the outer wall of the tubes to be connected.

This exchange thus leads to better welding of the coupling to the tubes.

In order to manufacture a coupling of this type, the body 1 is made as known by a man skilled in the art; then the net 3 is placed against the inner wall 2 of the sleeve 1 and it is held there by force, for example by means of an expandable cylindrical core. By creating heating by the joulean effect of the net 3 or by electromagnetic induction, or by any other means, the net 3 thus penetrates the inner wall 2 by fusion of the material in its vicinity. After the withdrawal of the core, the coupling is ready to be used and the net 3 has "memory of shape" or elasticity which will tend to cause the net to resume its initial volume after it has been heated to melt the inner wall 2 and then cooled.

The electrically conducting element may, according to one variation, be constituted by a wire twisted about itself and wound in a spiral or helix.

Figure 4:
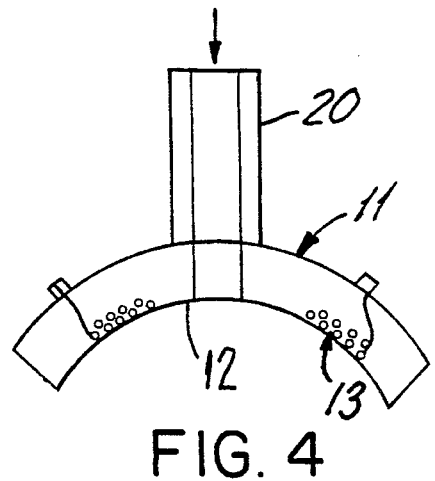
FIG. 4 is a cross-sectional view of a coupling according to a second embodiment of the present invention.

According to a second embodiment illustrated in FIG. 4, the thermo-weldable coupling comprises a body designated generally by the reference numeral 11: the latter is made from a thermo-fusible material compatible with the plastics material of the tubes to be connected. The coupling is generally semi-cylindrical in shape, whereof the inner wall 12, or connecting surface, is directly opposite the outer wall of the tubes to be connected. This inner wall 12 has an electrical element 13 which is resilient and of non-rectilinear shape.

In this embodiment, the body 11 includes a branch 20 which opens out substantially at the centre of the inner wall 12. At this point, the electrical element 13 includes an opening substantially of the same diameter as that of the branch 20.

Figure 5:
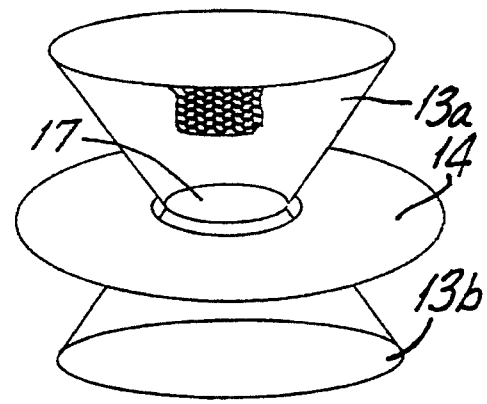
FIG. 5 is a perspective view of an electrical element employed in a coupling according to FIG. 4.

The electrically conducting element 13, as shown in FIG. 5, is constituted by two cones 13a and 13b which are obtained by knitting a single wire, identical to that described previously, which are in the form of very widely open cones and which face each other by their vertices provided with an opening 17, whereof the diameter is at least equal to that of the branch 20. These two sheets 13a and 13b constitute two secant cones.

The implementation and the manufacturing of such a coupling are represented in the series of FIGS. 6a to 6d.

Figure 6A:
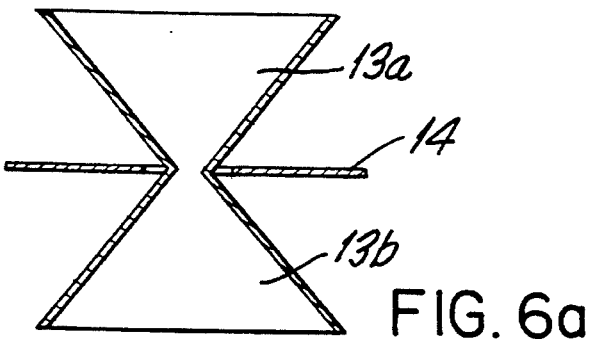
FIGS. 6a to 6d represent the method for producing an electrical element employed in a coupling according to FIG. 4.
Figure 6B:
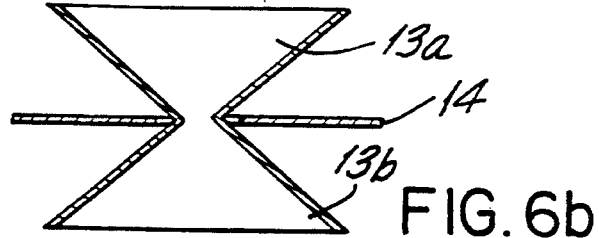
Figure 6C:
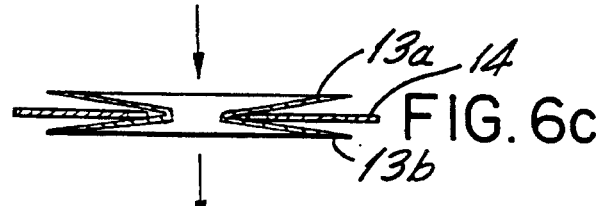
Figure 6D:
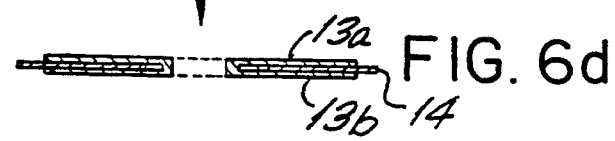

FIG. 6a represents two cones 13a and 13b which are obtained by a single knitting, either of one electrically conducting wire, or of a conducting and a non-conducting wire. An electrically insulating disc 14, having an opening in the middle, is placed between the two cones perpendicularly to the axis of the cones, with its opening placed on the smallest section of the cones.

The insulating disc 14 is placed at that position either by squeezing one of the two cones and forcing it to penetrate through the opening, or by cutting the disc in a radial direction, opening it and passing through the small section of the knitted cones.

After that, the two cones are pressed one against the other according to an axial direction (see FIGS. 6b to 6d), in order to create a flat structure consisting of two heating elements (13a, 13b) and an insulating layer (14). The electrically insulating layer (14) is interposed between the two electrically conducting layers (13a and 13b), in order to avoid any short-circuit between them, that can occur after compression of the two cones and putting them under electrical current.

The heating element created in that way (13) is flat, elastic and resilient, so that when it is heated, it melts the surrounding material and it tends to regain its original form of two connected cones.

In order to integrate the heating element (13) into the plastics coupling, this element is fairly heated for a short period and crushed against the inner wall (12) of the coupling (20). The surrounding plastics melts and the heating element penetrates slidely by force inside the plastics material.

Figure 7:
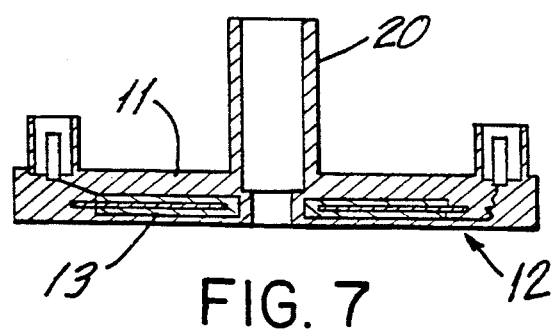
FIG. 7 represents a longitudinal sectional view of the coupling produced according to the method presented in FIGS. 6a to 6d.
Figure 8:
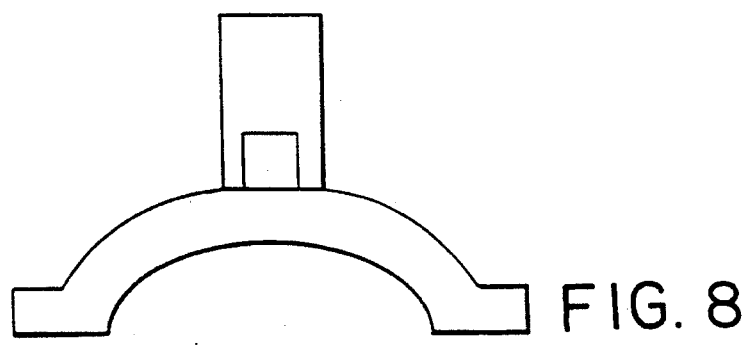
FIG. 8 is a cross sectional view of a coupling presented in FIG. 4.

At the time of welding of a saddle-type coupling (20) to a tube that is not represented here, the flat heating element (13) is heated by Joulean effect for a long period (see FIG. 7 and 8). Then the two electrically conducting elements (13a, 13b) tend to resume their original form; the first one (13a) is expanding towards the interior of the coupling and the second (13b) is expanding towards the interior of the tube to be welded.

This way a better penetration of the heating elements into the molten plastic material of both parts is achieved and consequently a better welding is achieved.

What is claimed:

1. A thermo-weldable coupling for connecting in particular two members made from an identical or a compatible plastics material, comprising a body formed from at least a thermofusable material compatible with said plastics material of said members and which comprises an inner wall or connection surface, directly opposite the outer wall of said members, said body being provided with an electrically conducting element having the shape of a net obtained by knitting two wires, wherein said net is obtained by knitting a conducting wire and a non-conducting wire.

2. The thermo-weldable coupling according to claim 1 wherein the conducting wire is covered with an insulating varnish which withstands welding temperatures.

3. The thermo-weldable coupling according to claim 1 wherein the non-conducting wire consists of plastics material.

4. The thermo-weldable coupling according to claim 1 wherein the electrically conducting element comprises two sheets which are obtained by a continuous knitting in the form of two widely open cones, facing each other by their vertices, and are pressed one against the other in order to obtain a disc.

5. The thermo-weldable coupling according to claim 4 wherein an insulating element is interposed between the two cones.

6. The thermo-weldable coupling according to claim 5, wherein the insulating has an opening of approximately the same diameter as the vertices of the cones.

7. A method for producing the coupling of claim 1 wherein the electrically conducting element is applied under pressure against the inner wall of the coupling, is kept by force in this position and is heated in order to penetrate said inner wall.

8. A thermo-weldable coupling for connecting in particular two members made from an identical or a compatible plastics material, comprising a body formed from at least a thermofusible material compatible with said plastics material of said members and which comprises an inner wall or connection surface, directly opposite the outer wall of said members, said body being provided with an electrically conducting element having the shape of a net obtained by knitting a single wire, wherein the core of said wire is covered by two layers of different materials.

9. The thermo-weldable coupling according to claim 8, wherein the first layer is an insulating varnish which withstands welding temperatures.

10. The thermo-weldable coupling according to claim 8, wherein the second layer is a thermo-fusible material, compatible with that constituting said coupling.

11. The thermo-weldable coupling according to claim 8, wherein the electrically conducting element is constituted by two sheets which are obtained by a continuous knitting in the form of two widely open cones, facing each other by their vertices, and are pressed one against the other in order to obtain a disc.

12. The thermo-weldable coupling according to claim 11, wherein an insulating element is interposed between the two cones.

13. The thermo-weldable coupling according to claim 12, wherein the insulating element has an opening of approximately the same diameter as the vertices of the cones.

14. A method for producing the coupling of claim 8 wherein the electrically conducting element is applied under pressure against the inner wall of the coupling, is kept by force in this position and is heated in order to penetrate said inner wall.

* * * * *

UNITED STATES PATENT AND TRADEMARK OFFICE
CERTIFICATE OF CORRECTION

PATENT NO. : 5,478,118
DATED : Dec. 26, 1995
INVENTOR(S) : Barq et al.

It is certified that error appears in the above-indentified patent and that said Letters Patent is hereby corrected as shown below:

In column 5, claim 6, line 39, after the word "insulating" add -- element --.

Signed and Sealed this

Nineteenth Day of March, 1996

*Attest:*

BRUCE LEHMAN

*Attesting Officer*   *Commissioner of Patents and Trademarks*